United States Patent
Karuvath et al.

(10) Patent No.: US 10,497,014 B2
(45) Date of Patent: Dec. 3, 2019

(54) RETAIL STORE DIGITAL SHELF FOR RECOMMENDING PRODUCTS UTILIZING FACIAL RECOGNITION IN A PEER TO PEER NETWORK

(71) Applicant: INREALITY LIMITED, Hong Kong (CN)

(72) Inventors: Shylesh Karuvath, Hong Kong (CN); Hiok Hwee Bernard Tan, Hong Kong (CN); Ronald Andre Levac, Hong Kong (CN)

(73) Assignee: INREALITY LIMITED, Hong Kong (CN)

( * ) Notice: Subject to any disclaimer, the term of this patent is extended or adjusted under 35 U.S.C. 154(b) by 232 days.

(21) Appl. No.: 15/493,149

(22) Filed: Apr. 21, 2017

(65) Prior Publication Data

US 2017/0308919 A1   Oct. 26, 2017

Related U.S. Application Data

(60) Provisional application No. 62/326,018, filed on Apr. 22, 2016.

(51) Int. Cl.
*G06Q 30/02* (2012.01)
*G06K 9/00* (2006.01)
(Continued)

(52) U.S. Cl.
CPC ....... *G06Q 30/0204* (2013.01); *G06K 9/0061* (2013.01); *G06K 9/00281* (2013.01);
(Continued)

(58) Field of Classification Search
CPC ........... G09G 2380/04; G06Q 30/0251; G06Q 30/0261; G06Q 30/0269; G06Q 30/0631;
(Continued)

(56) References Cited

U.S. PATENT DOCUMENTS 5,111,196 A * 5/1992 Hunt ................. G06F 3/147
235/383
6,188,777 B1 * 2/2001 Darrell .............. G06K 9/00362
348/169

(Continued)

FOREIGN PATENT DOCUMENTS

| CN | 105243358 | 7/2012 |
|---|---|---|
| WO | 2007120686 | 12/2007 |
| WO | 2017035025 | 3/2017 |

OTHER PUBLICATIONS

Haritaoglu, Ismail et al., Attentive Billboards IEEE, 2001 (Year: 2001).*

(Continued)

*Primary Examiner* — Scott L Jarrett
(74) *Attorney, Agent, or Firm* — Eagle IP Limited; Jacqueline Lui (57) ABSTRACT

A method that expedites processing of facial recognition from facial images captured by different cameras in a local area network (LAN). The method generates a first facial pattern for a first facial image of a person and a first facial identification that is unique to the first facial pattern. A second facial pattern is generated from a second facial image and compared, by a computer in the LAN, with the first facial pattern to determine whether the first facial image and the second facial image are both from the same person. A second facial identification of the second facial pattern is generated when the second facial image is determined to be different from the first person. If the second facial pattern is determined to be the same as the first facial pattern generated from the first facial image of the first person, the second facial pattern is assigned the first facial identification. The first and second facial patterns and their facial identifications are shared among the computers in the LAN to expedite processing of facial recognition.

12 Claims, 8 Drawing Sheets

(51) Int. Cl.
*G06Q 30/06* (2012.01)
*H04N 7/18* (2006.01)
*G06T 11/60* (2006.01)

(52) U.S. Cl.
CPC ..... *G06K 9/00295* (2013.01); *G06K 9/00302* (2013.01); *G06K 9/00771* (2013.01); *G06K 9/00979* (2013.01); *G06Q 30/0631* (2013.01); *G06T 11/60* (2013.01); *H04N 7/181* (2013.01)

(58) Field of Classification Search
CPC ........... G06Q 30/0242; G06Q 30/0271; G06Q 30/0641; G06T 2207/30201; G06T 7/292; G06T 2207/30196; G06T 7/00; G06K 9/00221; G06K 9/00248; G06K 9/00268; G06K 9/00302; G06K 9/00671
See application file for complete search history.

(56) References Cited

U.S. PATENT DOCUMENTS

| | | | | |
|---|---|---|---|---|
| 7,006,982 B2 * | 2/2006 | Sorensen | G06Q 30/02 | 705/7.29 |
| 7,043,056 B2 * | 5/2006 | Edwards | G06K 9/00248 | 382/103 |
| 7,203,338 B2 * | 4/2007 | Ramaswamy | G06K 9/00369 | 348/169 |
| 7,636,456 B2 * | 12/2009 | Collins | G09F 27/00 | 382/118 |
| 7,643,658 B2 * | 1/2010 | Kilner | G06K 9/00221 | 382/103 |
| 7,908,237 B2 * | 3/2011 | Angell | G06K 9/00771 | 705/14.38 |
| 7,921,036 B1 * | 4/2011 | Sharma | G06Q 20/3674 | 705/14.49 |
| 7,987,111 B1 * | 7/2011 | Sharma | G06Q 30/0201 | 705/7.29 |
| 8,010,402 B1 * | 8/2011 | Sharma | G06Q 10/00 | 705/14.49 |
| 8,073,206 B2 * | 12/2011 | Kamiyama | H04N 7/181 | 348/143 |
| 8,116,534 B2 * | 2/2012 | Nishiyama | G06K 9/00255 | 382/103 |
| 8,219,438 B1 * | 7/2012 | Moon | G06Q 30/0201 | 705/7.29 |
| 8,231,017 B2 * | 7/2012 | Clontz | A47F 5/0043 | 211/134 |
| 8,306,845 B2 * | 11/2012 | D'Imporzano | G06Q 10/06393 | 705/7.29 |
| 8,311,293 B2 * | 11/2012 | Okada | G06K 9/00308 | 382/118 |
| 8,331,691 B2 * | 12/2012 | Aoki | H04N 5/765 | 382/209 |
| 8,559,684 B1 * | 10/2013 | Nechyba | G06K 9/00926 | 382/118 |
| 8,560,357 B2 * | 10/2013 | Sickenius | G06Q 30/02 | 705/14.58 |
| 8,589,968 B2 * | 11/2013 | Alberth | H04N 7/18 | 725/10 |
| 8,667,539 B2 * | 3/2014 | Hartson | H04N 5/44504 | 725/19 |
| 8,706,544 B1 * | 4/2014 | Sharma | G06Q 30/0202 | 705/7.31 |
| 8,775,252 B2 * | 7/2014 | Wu | G06Q 30/02 | 705/14.43 |
| 8,903,123 B2 * | 12/2014 | Tsurumi | G06K 9/00295 | 348/169 |
| 9,015,737 B2 * | 4/2015 | Garza | H04N 21/44218 | 725/12 |
| 9,031,862 B2 * | 5/2015 | Hiyama | G09F 19/00 | 705/14.49 |
| 9,092,660 B2 * | 7/2015 | Yamada | G06K 9/00268 | |
| 9,134,399 B2 * | 9/2015 | Brown | G01S 5/16 | |
| 9,183,429 B2 * | 11/2015 | Qi | G06K 9/00221 | |
| 9,275,285 B2 * | 3/2016 | Srinivasan | G06K 9/00771 | |
| 9,449,233 B2 * | 9/2016 | Taylor | G06T 7/292 | |
| 9,483,790 B2 * | 11/2016 | Marshall | G06Q 30/0635 | |
| 9,704,020 B2 * | 7/2017 | Koul | G06K 9/00 | |
| 9,801,517 B2 * | 10/2017 | High | E01H 5/12 | |
| 9,875,719 B2 * | 1/2018 | Eckhoff | G06Q 30/02 | |
| 9,892,325 B2 * | 2/2018 | Kanga | G06K 9/00778 | |
| 9,892,424 B2 * | 2/2018 | Abraham | G06Q 30/0251 | |
| 9,911,290 B1 * | 3/2018 | Zalewski | G07G 1/0072 | |
| 10,043,058 B2 * | 8/2018 | Ahmed | G06K 9/00288 | |
| 10,043,360 B1 * | 8/2018 | Mullins | G08B 13/19615 | |
| 10,074,126 B2 * | 9/2018 | Gopalsamy | G06Q 30/0631 | |
| 10,198,988 B2 * | 2/2019 | Howard | G06F 3/1446 | |
| 10,212,778 B1 * | 2/2019 | Fu | G06K 9/00 | |
| 10,290,031 B2 * | 5/2019 | Reid | G06K 9/00335 | |
| 10,318,919 B2 * | 6/2019 | Bermudez Rodriguez | G06Q 10/087 | |
| 2002/0035560 A1 * | 3/2002 | Sone | G06Q 30/06 | |
| 2002/0113123 A1 * | 8/2002 | Otto | G06K 17/0022 | 235/381 |
| 2003/0115096 A1 * | 6/2003 | Reynolds | G06Q 30/02 | 705/14.58 |
| 2003/0217294 A1 * | 11/2003 | Kyle | G06K 9/00221 | 713/186 |
| 2004/0136574 A1 * | 7/2004 | Kozakaya | G06K 9/00228 | 382/118 |
| 2005/0197923 A1 * | 9/2005 | Kilner | G06K 9/00221 | 382/118 |
| 2005/0198661 A1 * | 9/2005 | Collins | G06Q 30/02 | 725/19 |
| 2007/0011711 A1 * | 1/2007 | Wolf | G06K 9/00342 | 725/105 |
| 2007/0177023 A1 * | 8/2007 | Beuhler | G08B 13/19645 | 348/211.3 |
| 2007/0273504 A1 * | 11/2007 | Tran | A61B 5/0022 | 340/539.12 |
| 2008/0109397 A1 * | 5/2008 | Sharma | G06Q 30/02 | |
| 2008/0159601 A1 | 7/2008 | Alberth et al. | | |
| 2008/0212849 A1 * | 9/2008 | Gao | G06K 9/00255 | 382/118 |
| 2008/0232651 A1 * | 9/2008 | Woo | G06K 9/00221 | 382/118 |
| 2008/0247611 A1 * | 10/2008 | Aisaka | G06K 9/00261 | 382/118 |
| 2008/0273766 A1 * | 11/2008 | Kim | G06K 9/00295 | 382/118 |
| 2009/0185723 A1 * | 7/2009 | Kurtz | G06K 9/00288 | 382/118 |
| 2009/0217315 A1 | 8/2009 | Malik et al. | | |
| 2011/0047384 A1 * | 2/2011 | Jacobs | G06K 9/00221 | 713/176 |
| 2012/0213422 A1 * | 8/2012 | Niskanen | G06K 9/00228 | 382/118 |
| 2012/0249802 A1 * | 10/2012 | Taylor | G06K 9/00771 | 348/169 |
| 2012/0250950 A1 * | 10/2012 | Papakipos | G06K 9/00677 | 382/118 |
| 2012/0288165 A1 * | 11/2012 | Bedros | G06K 9/00221 | 382/118 |
| 2013/0054310 A1 * | 2/2013 | Sickenius | G06Q 30/02 | 705/7.39 |
| 2013/0129210 A1 * | 5/2013 | Na | G06Q 30/02 | 382/165 |
| 2013/0265450 A1 * | 10/2013 | Barnes, Jr. | H04N 5/77 | 348/207.1 |
| 2014/0130076 A1 | 5/2014 | Moore et al. | | |
| 2015/0154462 A1 * | 6/2015 | Rosenkrantz | G06K 9/00885 | 348/77 |
| 2015/0269645 A1 * | 9/2015 | Gibson | G06Q 30/0631 | 705/26.7 |
| 2015/0356610 A1 * | 12/2015 | Ponoth | G06Q 10/087 | 705/14.58 |
| 2016/0034244 A1 * | 2/2016 | Howard | G06F 3/1446 | 345/156 |
| 2016/0035012 A1 * | 2/2016 | Abell | G06Q 30/0641 | 705/27.1 |

(56) References Cited

U.S. PATENT DOCUMENTS

| | | | |
|---|---|---|---|
| 2016/0203499 A1* | 7/2016 | Yamashita | G06Q 30/02 705/7.29 |
| 2016/0282900 A1 | 9/2016 | Levac et al. | |
| 2016/0313959 A1* | 10/2016 | Abell | G06Q 10/00 |
| 2016/0379225 A1* | 12/2016 | Rider | G06Q 30/0201 382/116 |
| 2017/0164314 A1* | 6/2017 | Wylie | H04L 67/303 |
| 2017/0270566 A1* | 9/2017 | Vamanamoorthy | G06Q 30/0269 |
| 2018/0239954 A1* | 8/2018 | Hamada | G08B 13/196 |

OTHER PUBLICATIONS

Gutta, Srinivas et al., Gender and Ethnic Classification of Face Images IEEE, 1998 (Year: 1998).*

Kisku, Dakshina R. et al., Face Recognition by Fusion of Local and Global Matching Scores using DS Theory: An Evaluation of Uni-Classifer and Multi-Classfier Paradigm, Cornell University, Feb. 2010 (Year: 2010).*

Trlica, Chirs, Facial Recognition: A Game Changing Technology for Retailers LP Magazine, May-Jun. 2013 (Year: 2013).*

Thorat, Dr. S.B. et al., Facial Recognition Technology: An analysis with scope in India International Journal of Computer Science and Information Security, vol. 8, No. 1, 2010 (Year: 2010).*

Mandasari, Miranti Indar et al., Score Calibration in Face Recognition IET Biometrics, vol. 3, No. 4, 2014 (Year: 2014).*

Mohanty, Pranab et al., From Scores to Face Templates: A Model Based Approach IEEE Transactions on Pattern Analysis and Machine Intelligence, vol. 29, No. 12, Dec. 2007 (Year: 2007).*

Gaynor, Mark, Hidden Cameras Reveal Human Side of P-O-P Story P-O-P Times, 1999 (Year: 1999).*

Underhill, Paco, Why We Buy: The Science of Shopping Simon & Schuster, 1999 (Year: 1999).*

Soyata, Tolga et al., Cloud-Vision: Real-time Face Recognition Using a Mobile-Cloudlet-Cloud Acceleration Architecture 2012 IEEE Symposium on Computers and Communications, ISCC (Year: 2012).*

Tabatabaee, Hamid et al., Cooperative Criminal Face Recognition in Distributed Web Environment IEEE, 2008 (Year: 2008).*

Yan, Yanjun et al., Distributed wireless face recognition system Proceedings of SPIE, Electronic Imaging, 2008 (Year: 2008).*

Peterson, Hayley, Grocery Store Shelves Could Soon Watch You While You Shop Business Insider, Oct. 16, 2013 (Year: 2013).*

Rinner, Bernhard et al., An Introduction to Distributed Smart Cameras Proceedings of the IEEE, vol. 96, No. 10, Oct. 2008 (Year: 2008).*

Amir, Amiza et al., A Multi Feature Pattern Recognition for P2P-based System Using In-network Associative Memory Technical Report 2011/265, Clayton School of IT, Monash University, Victoria, Australia, 2011 (Year: 2011).*

Lin, Chang Hong et al., A Peer-to-Peer Architecture for Distributed Real-Time Gesture Recognition IEEE, 2004 (Year: 2004).*

Rubens, Paul, Facial Recognition: Show where everybody knows your name BBC News, Dec. 8, 2014 (Year: 2014).*

Fatemi, Hamed et al., Real-time face recognition on a smart camera Proceedings of Acivs (Advanced Concepts for Intelligent Vision Systems), Sep. 2-5, 2003 (Year: 2003).*

Nicolo, Francesco et al., Near real-time face detection and recognition using a wireless camera network SPIE Defence, Security and Sensing, 2012 (Year: 2012).*

* cited by examiner

| Event | ID | Entry | Exit | GEN | AGE | X | Y | Smile | Blink |
|---|---|---|---|---|---|---|---|---|---|
| 1 | 56 | 1:35:16 | 1:35:46 | F | 24 | 50 | 24 | Y | 6 |
| 2 | 56 | 1:36:02 | 1:36:11 | M | 32 | 52 | 23 | N | 2 |
| 3 | 57 | 1:36:15 | 1:36:23 | F | 46 | 13 | 27 | N | 3 |
| 4 | 56 | 1:36:19 | 1:36:31 | M | 29 | 54 | 24 | N | 5 |
| 5 | 57 | 1:36:25 | 1:36:29 | F | 54 | 17 | 30 | Y | 2 |
| 6 | 57 | 1:36:32 | 1:36:34 | F | 56 | 22 | 29 | Y | 1 |

RETAIL STORE DIGITAL SHELF FOR RECOMMENDING PRODUCTS UTILIZING FACIAL RECOGNITION IN A PEER TO PEER NETWORK

FIELD OF THE INVENTION

The present invention relates to a method that expedites processing of facial recognition of a person in a local network.

BACKGROUND

People travel in commercial or public areas for various reasons and often stop or gaze at different attractions, such as products, posters, advertisements, maps, directions, announcements, etc. Tracking the movements and the gazes of these people provides important information to commercial enterprises.

One problem, however, is that current technologies track the mobile phone signals in which either the Bluetooth or WiFi of the mobile phones must be enabled. This type of tracking significantly reduces the tracking efficiency. Another problem is large processing resources are required to recognize, track, and record these people and their movements. This processing can also be time-consuming and take too long to provide valuable real-time information.

New methods and systems that expedite processing of facial recognition of people will assist in advancing this technology field.

SUMMARY OF THE INVENTION

One example embodiment is a method that expedites processing of facial recognition from facial images captured by different cameras in a local area network (LAN). The method generates a first facial pattern for a first facial image of a person and a first facial identification that is unique to the first facial pattern. A second facial pattern is generated from a second facial image and compared, by a computer in the LAN, with the first facial pattern to determine whether the first facial image and the second facial image are both from the same person. A second facial identification of the second facial pattern is generated when the second facial pattern is determined to be different to the first facial pattern generated from the first facial image of the person. If the second facial pattern is determined to be the same as the first facial pattern generated from the first facial image of the first person, the second facial pattern is assigned the first facial identification. The first and second facial patterns and their facial identifications are shared among the computers in the LAN to expedite processing of the facial recognition.

Other example embodiments are discussed herein.

DETAILED DESCRIPTION

Example embodiments include systems and methods that expedite processing of facial recognition in a local area network.

Traditionally, people tracking technologies track the mobile phone signals of the users. One drawback with this method is that either the Bluetooth or WiFi of the mobile phones must be turned on, significantly reducing the tracking efficiency.

As an alternative to tracking the mobile phones of the users, video analytics are used to understand the travel behavior of people. However, people tracking through video analysis suffers from long processing time and low accuracy. Each time a face is detected, it is counted as a new face. For example, a person may be detected in the same area multiple times while walking around in a building. This inflates the number of people counted, as the same person can be counted multiple times through video analytics. Further, the captured video is processed remotely by a central server, which leads to a long processing time and significantly reduces the tracking efficiency of people.

In order to track people efficiently and provide a recommendation to a target person effectively, example embodiments include systems and methods that track people by capturing videos or facial images of people. The facial images are converted to facial patterns by a computer in a local area network (LAN) and compared with registered facial patterns. For example, a newly determined facial pattern is compared with one or more facial patterns that are stored in the memory of the same computer or in other computers in the LAN. The computer in the LAN performs expedited facial recognition processing and records the behavior of the target.

As one example, a computer system includes two or more computers and displays in communication with each other in a LAN. Each computer includes a camera that can take a video or a facial image of a person when the person steps into a field of view of the camera. The computer converts the captured facial image to a facial pattern and saves the facial pattern to a memory of the computer that stores a plurality of registered facial patterns. Each facial pattern is assigned a unique identification that corresponds to one of the facial patterns. The facial patterns and unique facial identifications are shared among computers in the LAN, and this sharing significantly reduces subsequent processing of facial recognition. For example, when a camera in a computer detects a person, the processor of the computer compares the facial pattern of the person with the plurality of registered facial patterns stored in the memory and from other computers in the LAN and determines whether the facial pattern of the person matches one the plurality of facial patterns stored in the memory or from other computers in the LAN. The computers can share the facial patterns directly with each other (e.g., via a P2P network), share them with a central server, or share them via an intermediary electronic device (e.g., with an edge computer, edge device, or other electronic device, such as a computer that wirelessly transmits the facial patterns to other computers in the network).

By way of example, if none of the registered facial patterns match the facial pattern of the person, then the processor of the computer generates a unique identification for the facial pattern of the person and then shares this information with other computers in the network. The newly generated identification and its corresponding facial pattern are then saved to the memory to update the pool of registered facial patterns and identifications.

When a match is found in the registered facial patterns, then no new identification is generated, and the existing identification of the registered facial pattern is retrieved from the memory and assigned to the person. By updating the registered facial patterns continuously and by sharing the memory with other computers in the LAN, the same person is only counted once even though he or she is detected multiple times by one or more computers in the LAN.

Further, an example embodiment executes facial recognition to determine whether a same person was at two different locations. The computer does not have to perform facial recognition to identify a person (e.g., compare the captured facial image with a large database to determine a name of the person). Instead, facial recognition can be performed more quickly by converting a facial image into an assessment and assignment of values that represent a person's facial pattern as determined from their facial features. The facial patterns generated can be compared to answer the following question: Was this same person at a previous location in the LAN? Here, the identity of the person is anonymized. Instead, the computer system determines whether the same person was at two different locations by comparing the facial pattern generated. People thereafter are tracked, recorded, and/or mapped according to a facial pattern and a unique facial identification assigned to them. Identifying and tracking people in accordance with this example embodiment is faster and easier for the computer to process than comparing individual identities.

Facial recognition or face recognition is a biometric method of identifying an individual by comparing live capture or digital image data with the stored record. The conventional facial recognition process runs a few steps: the face of the person is enrolled or registered by taking an image of the face and saving the image to a database; when a live image capture of a person occurs, it is compared against the faces registered in the database; based on similarity of facial features, return a matching score between 0-100%. The conventioneer facial recognition process allows only a single face to be registered and processed at a time.

In contrast, example embodiments process multiple faces in the same field of view at any given time, significantly accelerating the methodology of detecting and processing faces. In addition, the processed images of people are shared across a network of computers on a Local Area Network (LAN), extending the solution from a single location where a single face detection device is being used to a network of devices in the same venue. Further, when a person is detected at the first location, his or her facial pattern (not a photo) is shared with the other devices on the LAN. When that same facial pattern is detected on another sensor, the person is given the same unique ID, making it possible to trace the steps through the venue, generating a "Consumer Journey".

Example embodiments use a session to count the same person moving in and out of a field of view of one or more cameras in different events. A detected face might be a continuation of a previous event (e.g., a person gazes a camera, turns away for a period of time, and then gazes back at the camera). Breaks in face detection occur when the person looks away from the camera or is blocked temporally by other moving objects (e.g., blocked by another person). The interrupted events that belong to the same person are all saved under the same session. Example embodiments analyze parameters (such as locations of the face, gender and age of the face, and time period between events) and determine whether a second event is a continuation of a first event. Further, trajectory calculations are used to determine the odds of the second event being a continuation of the first event for moving faces.

In one example embodiment, one or more computers in the computer system retrieve recommended items based on an identification of the person. The recommended items are displayed at a display located along the footpath of the target person. For example, this item could be information about the location of an object (e.g., directions to a bathroom, a store, a restaurant, etc.). Alternatively, this item could be information about a product (e.g., an advertisement or other information that informs the person about the product).

In an example embodiment, a font size of the recommended items are adjusted in real time in accordance with the distance between the person and the display.

In one example embodiment, attributes of a facial pattern of a person (such as gaze time, geographical location and facial expressions) are recorded and saved in a table in a memory of a computer, such as saving the attributes locally or saving them on a cloud server. Other attributes (such as the age and gender of the person) are further obtained by analyzing the facial pattern of the person, and saved in the table. The table is continuously updated and shared among the computers in the system through a LAN or a peer-to-peer (P2P) network when the person or other people are tracked and analyzed by other computers in the computer system. Sharing of this information expedites processing of facial recognition, retrieving user-specific information, mapping movements of people, and executing other tasks discussed herein.

One or more computers in the computer system or the cloud server are able to generate a report that includes a number of people within a field of view of the camera at any given time interval, a footpath of the people, and a chart that shows a distribution of gender, age, gaze time at a display and facial expressions of the people.

In one example embodiment, the effectiveness of delivering recommended items to a target is measured by tracking the gaze time at the display and facial expressions of any person who viewed the display. The characteristics or behavior of the people viewing the content at the display is then used to modify or adjust what will be selected to be presented as content (e.g., what products are recommended to a person, what information about a product is provided to a person, etc.). The view behavior is further monitored in order to evaluate the quality of the recommended items displayed to the person and processed to make further adjustments in order to meet certain objectives.

Figure 1:
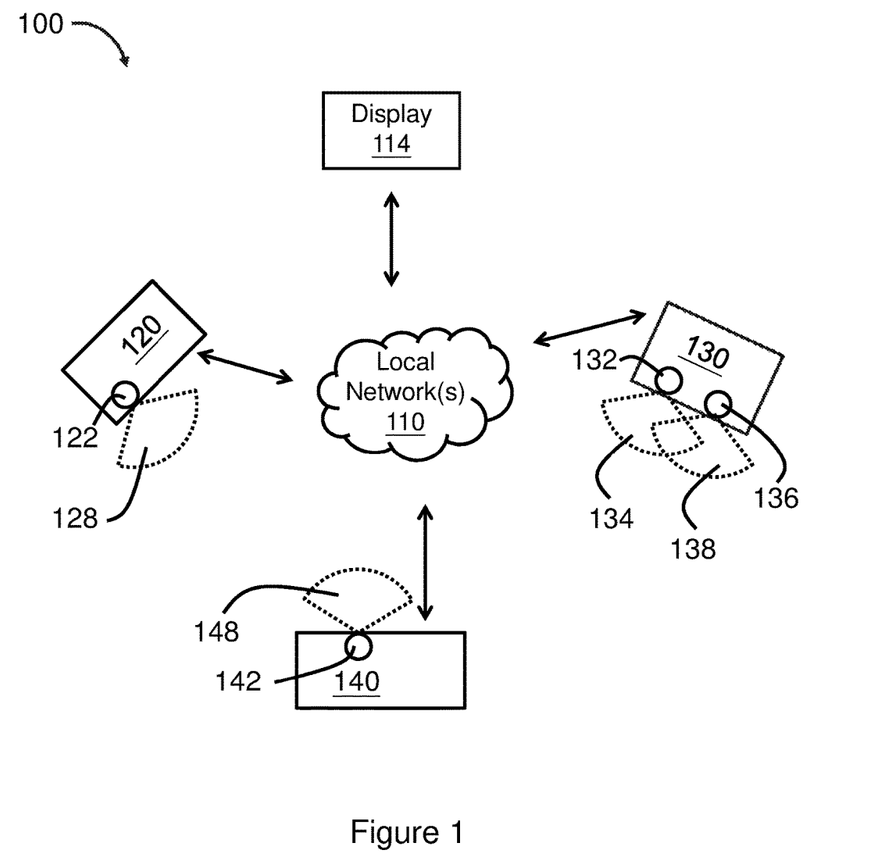
FIG. 1 is a computer system in accordance with an example embodiment.

FIG. 1 is a computer system 100 in accordance with an example embodiment. The computer system includes a plurality of computers 120, 130 and 140, and a display 114 in communication with the computers through one or more local networks 110. Each computer includes one or more cameras 128, 132, 136 and 142. The camera 122 of computer 120 has a field of view 128. The cameras 132 and 136 of computer 130 have a field of view 134 and a field of view 138, respectively. The camera 142 of computer 140 has a field of view 148. The display 114 can also include a camera.

By way of example, the computers 120, 130 and 140 include, but are not limited to, handheld and/or portable computing devices, stationary or mounted computing devices, displays, desktop computers, edge computer or edge computing device, portable computers (such as tablet and notebook computers), combinations of these devices, and other portable and non-portable electronic devices and systems. An example of a computer also appears in FIG. 2.

By way of example, the local networks 110 can include one or more of a local area network (LAN), a home area network (HAN), a P2P network, etc.

In one example embodiment, the computer system performs expedited facial recognition processing and records the behavior of the target person. When a person walks in a building (or other location that includes an example embodiment) and steps into a field of view of a camera of one of the computers, the camera takes a video or a facial image of the person. The computer converts the captured facial image to a facial pattern and saves the facial pattern to a memory of the computer that stores a plurality of registered facial patterns. The computer then assigns a unique identification number to the facial pattern, and stores the facial patterns and facial identifications. The processor of the computer compares the facial pattern generated of the person with the plurality of registered facial patterns stored in the memory or from other computers in the LAN and determines whether the facial pattern of the person matches one the plurality of facial patterns stored in the memory or from other computers in the LAN.

The registered facial patterns are continuously updated when a new facial pattern that does not match any of the registered facial patterns is detected and saved to the memory. The registered facial patterns and the facial identifications are shared with other computers in the local network. Therefore, the same person is only counted once even though he or she is detected multiple times by one or more computers in the local network since each person is associated with a single, unique facial identification.

In one example embodiment, recommended items based on an identification of the person are retrieved and displayed at the display 114. As one example, a sensor or a camera is mounted on the display to detect a distance between the person and the display. A font size of the recommended items are adjusted in real time in accordance with the distance. Feedbacks such as the gaze time of the person at the display and the facial expressions of the person are monitored by the cameras and further adjustments of the displaying content are made based on the feedbacks.

In one example embodiment, the computer system shares the facial patterns, identifications, and other information (e.g., age, gender, gaze time, location, etc.) with another computer system in a different building or a different area through a P2P network such that the footpath of the person is tracked among the connected computer systems.

Figure 2:
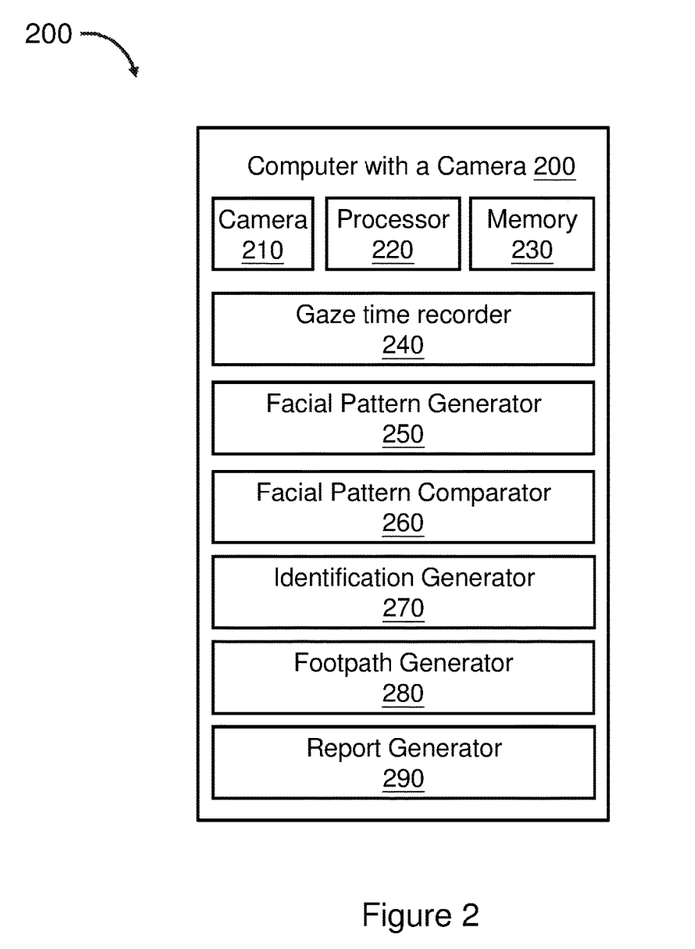
FIG. 2 is a computer with a camera in accordance with an example embodiment.

FIG. 2 is a computer with a camera 200 in accordance with an example embodiment. The computer with a camera 200 includes a camera 210, a processor 220, a memory 230, and one or more of a gaze time recorder 240, a facial pattern generator 250, a facial pattern comparator 260, an identification generator 270, a footpath generator 280 and a report generator 290. FIG. 2 shows these components in a single computer. Alternatively, one or more of these components can be distributed or included in various electronic devices, such as some components being included in a handheld and/or portable computing devices, some components being included in a desktop computers, some components being included in a portable computers, etc.

The camera 210 takes a video, a picture, or a facial image of a person when the person steps into a field of view of the camera. The facial image can be stored in memory and subsequently processed in accordance with an example embodiment. Alternatively, the facial image is processed in real-time as the facial image is captured. After the facial image is processed in real-time, it and/or facial pattern attributes extracted from the facial image are stored in memory 230, transmitted, further processed, etc. By way of example, the memory includes a random access memory (RAM) for temporary data storage and a read only memory (ROM) for permanent data storage. The memory stores applications, data, programs, algorithms and other data.

The processor 220 communicates with the memory 210 and performs operations and tasks that implement one or more blocks of the flow diagrams discussed in example embodiments, such as FIG. 3 to FIG. 7.

The gaze time recorder 240 communicates with the camera 210 to record a time period when a person is continuously viewing an item or a display. The computer monitors the field of view, records when a pattern is first detected, detects the length of time, and calculates the gaze time.

The facial pattern generator 250 receives facial images from the camera 210. By way of example, the facial pattern generator detects a face from a digital image and extracts a facial pattern that is unique to the facial image of the person. The face comprises certain facial features such as an eye, nose, mouth, ear, hair, space between the eyes, etc. In general, the facial pattern reflects characteristics of the face such as a location of a reference point on the face, and a distance between the reference point and the facial features. Examples of facial pattern generation methods are described in details in US patent application number US 20120213422 A1.

The facial pattern comparator 260 compares the facial pattern that is generated by the facial pattern generator 250 with a plurality of registered facial patterns stored in the memory 230. Each of the registered facial patterns have a unique identification. By way of example, the comparator calculates a matching score between the facial pattern and each of the plurality of registered facial patterns stored in the memory. The matching score is calculated based on a plurality of parameters, such as one or more of a geographical location of the facial patterns under comparison, entry time and exit time of the facial patterns, a mesh diagram of facial patterns, and a size of the facial patterns. The mesh diagram includes a reference point and a plurality of landmark points such as the locations of eyes and nose. Each landmark point has a distance to reference point.

By way of example, if the matching score is less than a threshold value, then none of the registered facial patterns match the facial pattern of the person. Under this condition, the identification generator 270 generates a unique identification for the facial pattern of the person (e.g., a unique number or other unique identification). The newly generated identification and its corresponding facial pattern are then saved to the memory to update the pool of registered facial patterns and identifications. If the matching score is higher than the threshold value, then a match is found in the registered facial patterns and no new identification is generated. The existing identification of the registered facial pattern that matches the facial pattern of the person is retrieved from the memory 230 and assigned to the person.

Consider an example in which a plurality of computers with a camera are distributed in a shopping mall. The computers are wirelessly connected with each through a LAN. The camera of each computer captures videos of a shopper when he or she steps into a field of view of the camera. The footpath generator 290 in the computer tracks the geographical locations of the shopper in the shopping mall and generates a footpath of the shopper. The computer then analyzes this footpath information to assist in studying the travel behavior of people, likes and dislikes, shopper interests, product popularity, advertisement effectiveness, traffic flow of people, etc.

In one example embodiment, other demographic information of the person (such as age and gender) are obtained by analyzing the facial pattern of the person. The demographic information if saved in the memory under the unique identification of the person. The registered facial patterns and the identification of each facial pattern and the demographic information are continuously updated and shared among the computers through a LAN. The report generator 290 generates a report that includes a number of people passing through a certain area at any given time interval, a footpath of the people, and a chart that shows a distribution of gender, age, and gaze time. The report can further include an attention percent based on a gaze time at an item, an entry time of people, and an exit time of the people.

Figure 3:
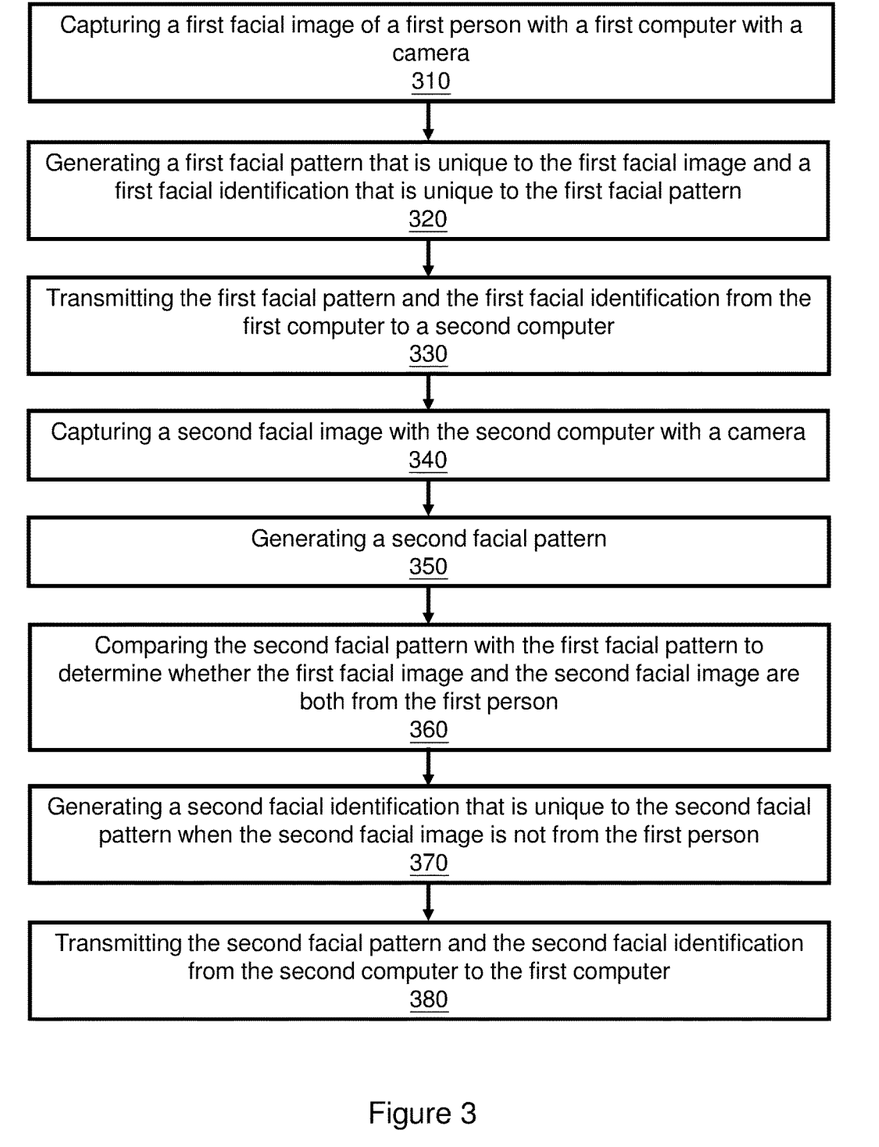
FIG. 3 is a method to expedite processing of facial recognition in accordance with an example embodiment.

FIG. 3 is a method to expedite processing of facial recognition in accordance with an example embodiment.

Block 310 states capturing a first facial image of a person with a first computer with a camera.

Consider an example in which a computer system includes a plurality of computers each having one or more cameras and displays in communication with each other through a LAN. The display can include a camera or other sensors and/or communicate with other cameras and computers. When a person steps into a field of view of one of the cameras, the camera captures a first facial image of the person.

Block 320 states generating a first facial pattern that is unique to the first facial image and a first facial identification that is unique to the first facial pattern.

By way of example, the computer receives the first facial image from the camera and processes the facial image by executing an algorithm stored in the memory of the computer that generates a first facial pattern that is unique to the first facial image. A first facial identification is further generated, which is unique to the facial pattern. The generated facial patterns and facial identifications are both saved in the memory of the computer.

Block 330 states transmitting the first facial pattern and the first facial identification from the first computer to a second computer.

For example, the first computer and the second computer are wirelessly connected with each other through a LAN. The first facial pattern and the first facial identification generated at the first computer are transmitted from the first computer to a second computer and any other computers in the computer system. Such transmissions can be via a P2P network or via another computer, such as transmitting the data to an edge computing device that then transmits the data to other computers in the network.

Block 340 states capturing a second facial image with the second computer with a camera. For example, when the person walks away from the first computer and passes by the second computer. In doing so, the person steps into a field of view of a camera of the second computer. At this time, the camera of the second computer captures a second facial image of the person.

Block 350 states generating a second facial pattern.

For example, the second computer receives the second facial image from its camera, processes the second facial image, and generates a second facial pattern that is unique to the second facial image.

Block 360 states comparing the second facial pattern with the first facial pattern to determine whether the first facial image and the second facial image are both from the person.

In one example embodiment, the second computer compares the second facial pattern with the first facial pattern that is transmitted from the first computer by calculating a matching score between the first facial pattern and the second facial pattern. The matching score is calculated based on a plurality of parameters including a correlation of the geographical locations of the first and second facial patterns, and a correlation of an exit time of the first facial pattern out of the first computer and an entry time of the second facial pattern into the field of view of the camera of the second computer. The matching score is further determined by similarities between a mesh diagram of the first and second facial patterns. The mesh diagram includes a reference point and a plurality of landmark points, such as the locations of eyes and nose with each land mark having a distance to reference point. As one example, the first facial image and the second facial image are determined to be from the person if the matching score is higher than a threshold value.

Block 370 states generating a second facial identification that is unique to the second facial pattern when the second facial image is not from the person.

If the matching score is lower than the threshold value, then the second facial pattern is determined to be not from the person having a first facial pattern. In other words, the first and second facial images were from different people. The second computer will then generate a second facial identification that is unique to the second facial pattern.

Block 380 states transmitting the second facial pattern and the second facial identification from the second computer to the first computer.

For example, the second facial pattern and the second facial identification are both saved to the memory of the second computer and transmitted to the first computer and other computers in the LAN by an edge computing device.

By updating and sharing the facial patterns and facial identifications continuously with other computers in the LAN, the same person is only counted once even though he or she is detected multiple times by one or more computers in the LAN.

Figure 4:
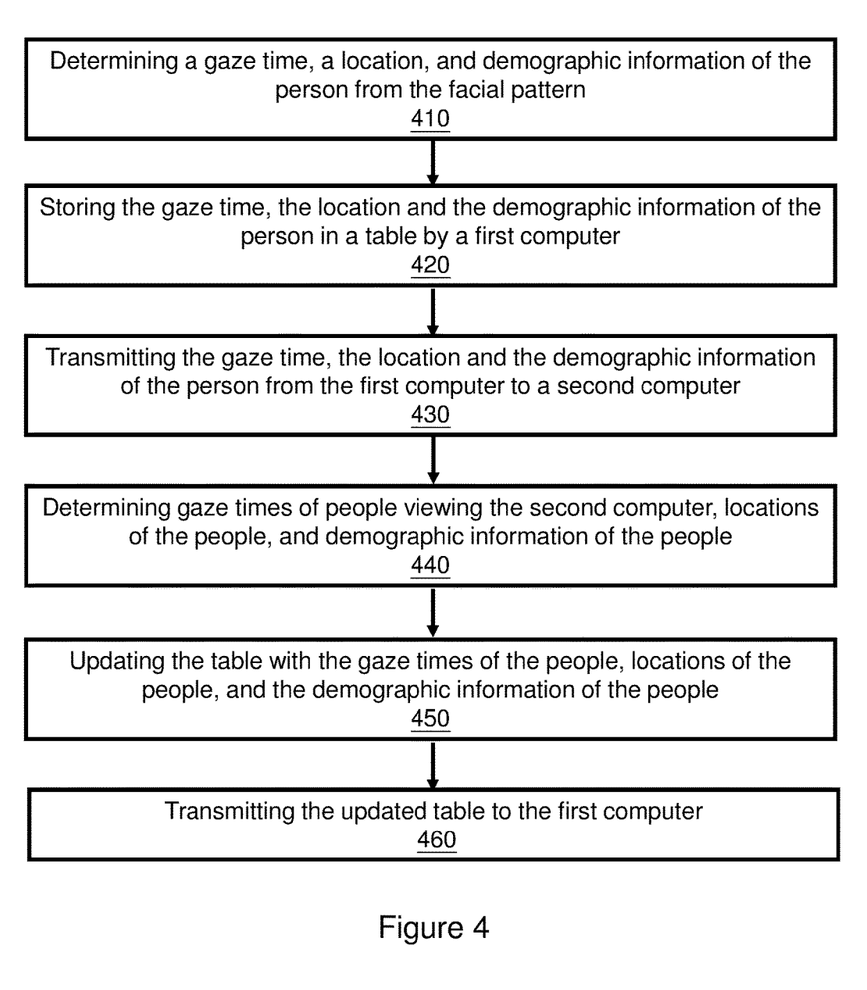
FIG. 4 is a method to share information to expedite processing of facial recognition in a computer system or peer-to-peer (P2P) network in accordance with an example embodiment.

FIG. 4 is a method to share information to expedite processing of facial recognition in a computer system in accordance with an example embodiment.

Block 410 states determining a gaze time, a location, and demographic information of the person from the facial pattern.

Consider an example in which a plurality of paintings are displayed in a gallery. A camera and a compact computer are installed above each painting. The computers for each painting are in communication with each other through a LAN. Viewers walking around in the gallery show various interests by looking at different paintings for different periods of time.

As one example, where a first camera captures a video, and sends the video to a first computer for processing. The first computer obtains a gaze time of the viewer, a geographic location of the viewer, and other demographic information of the viewer such as age and gender, through facial pattern analysis.

Block 420 states storing the gaze time, the location and the demographic information of the person in a table by a first computer.

In one example embodiment, the gaze time, geographical location and other demographic information of the viewer are recorded and saved in a table in a cloud server by a first computer. The table in the server is continuously updated using an edge computing device when other viewers gaze at the first painting. Each viewer is assigned a unique identification and his or her demographic information is saved in the server table under the corresponding unique identification.

Block 430 states transmitting the gaze time, the location and the demographic information of the person from the first computer to a second computer.

By way of example, the table is continuously updated and shared with a second computer and all other computers in the gallery through a LAN or a P2P network.

Block 440 states determining gaze times of people viewing the second computer, locations of the people, and demographic information of the people.

For example, viewers walk away from the first painting and stop at a second painting. A second camera and a second computer disposed at the second painting work together to obtain the gaze time of the viewer at the second painting, the location of the viewer, and demographic information of the viewer through facial pattern analysis.

Block 450 states updating the table with the gaze times of the people, locations of the people, and the demographic information of the people.

In one example embodiment, the gaze time, geographical location and other demographic information of the viewer at the second painting are recorded in the table under the unique identification of the viewer. The table is continuously updated when other viewers gaze at the second painting. Each viewer is assigned a unique identification in the table. If the same viewer comes back to the second painting, the gaze time is saved in the table under the pre-existing identification.

Block 460 states transmitting the updated table to the first computer.

The table is continuously updated and shared with the first computer and other computers in the gallery through a LAN or a P2P network in the gallery. Therefore, viewers in the gallery are tracked and analyzed by the cameras and computers connected through the network. This sharing expedites processing of the information since each computer is not required to process the same information. Instead, a single computer or computing device processes the information, updates the table, and shares the table with the other computers. In this way, each computer has a real-time updated table with information about the people in the LAN since each computer can function as a peer in a P2P network.

Further, an analysis report that shows a footpath of the viewers and a distribution of gender, age, gaze time at each painting can be generated, which helps the management of the gallery to understand the popularities of the paintings.

Figure 5:
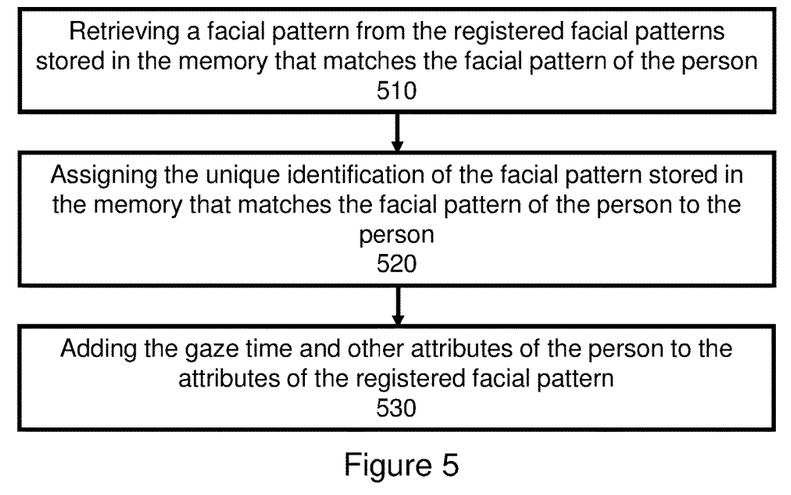
FIG. 5 is a method to assign an identification to a person to expedite processing of facial recognition in accordance with an example embodiment.

FIG. 5 is a method to assign an identification to a person to expedite processing of facial recognition in accordance with an example embodiment.

Block 510 states retrieving a facial pattern from the registered facial patterns stored in the memory that matches the facial pattern of the person.

Consider an example in which a computer system includes two or more computers and displays in a LAN. Each computer includes a camera that can take a video or a facial image of a person when the person steps into a field of view of the camera. The computer converts the captured facial image to a facial pattern and saves the facial pattern to a memory of the computer that stores a plurality of registered facial patterns and identifications; each identification corresponds to one of the facial patterns. The processor of the computer compares the facial pattern of the person with the plurality of registered facial patterns stored in the memory and determines whether the facial pattern of the person matches one the plurality of facial patterns stored in the memory.

When a match is found in the registered facial patterns, then the existing identification of the registered facial pattern is retrieved from the memory.

Block 520 states assigning the unique identification of the facial pattern stored in the memory that matches the facial pattern of the person to the person.

The retrieved identification of the registered facial pattern is then assigned to the person who has a facial pattern that matches one of the registered facial patterns.

Block 530 states adding the gaze time and other attributes of the person to the attributes of the registered facial pattern.

By way of example, attributes of the person (such as a gaze time or a location of the person) are updated under his or her unique identification. By updating the registered facial patterns and their attributes continuously, the behavior of the same person is continuously tracked and recorded even though he or she is detected multiple times by one or more computers at different locations in the LAN.

Figure 6:
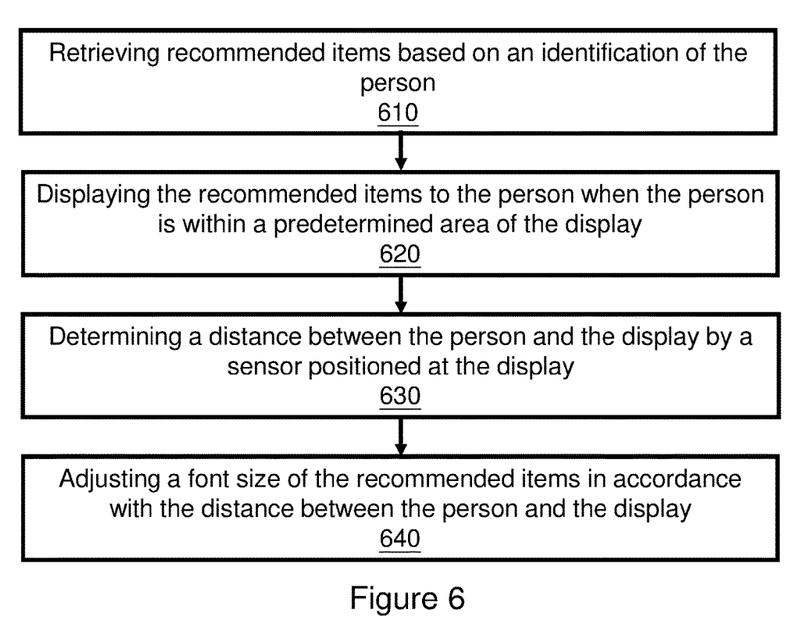
FIG. 6 is a method to provide a recommendation at a display to a person in accordance with an example embodiment.

FIG. 6 is a method to provide a recommendation at a display to a person in accordance with an example embodiment.

Block 610 states retrieving recommended items based on an identification of the person.

In one example embodiment, a computer retrieves recommended items based on an identification of the person determined based on a facial pattern of the person.

Block 620 states displaying the recommended items to the person when the person is within a predetermined area of the display.

For example, when the person is within a predetermined area of the display, the retrieved recommended items are displayed at the display near of the person.

Block 630 states determining a distance between the person and the display by a sensor positioned at the display.

Distance from the camera to the person can be determined with one or more sensors, such as a camera, a proximity sensor, infrared light, a laser, etc. Further various algorithms exist to determine a distance from a person to the camera.

For example, an infrared sensor or a camera is mounted on the display to detect a distance between the person and the display. The infrared sensor measures the distance by time of flight of an infrared pulse.

As another example, the computer analyzes the image of the face of a person and determines distance based on triangle similarity. Here, a distance to the person is based on known width of the face, focal length of the camera, and a width of pixels in the image.

As another example, facial recognition software examines the facial image and determines a distance from the camera based on distances between facial landmarks.

Block 640 states adjusting a font size of the recommended items in accordance with the distance between the person and the display.

For example, a font size of the recommended items are adjusted in real time in accordance with the distance between the person and the display (e.g., increase the font size as the distance increases and decrease the font size as the distance decreases). The gaze time of the person at the display and the facial expressions of the person are monitored by the cameras and further adjustments of the displaying content are made based on the feedback from the person.

In one example embodiment, the effectiveness of delivering recommended items to a target person is measured by tracking the gaze time at the display and facial expressions of any person who viewed the display. The characteristics or behavior of the person viewing the content at the display is then used to modify or adjust what will be selected to be presented as content. The view behavior is further monitored to evaluate the quality of the recommended items displayed to the person and make further adjustments.

Figure 7:
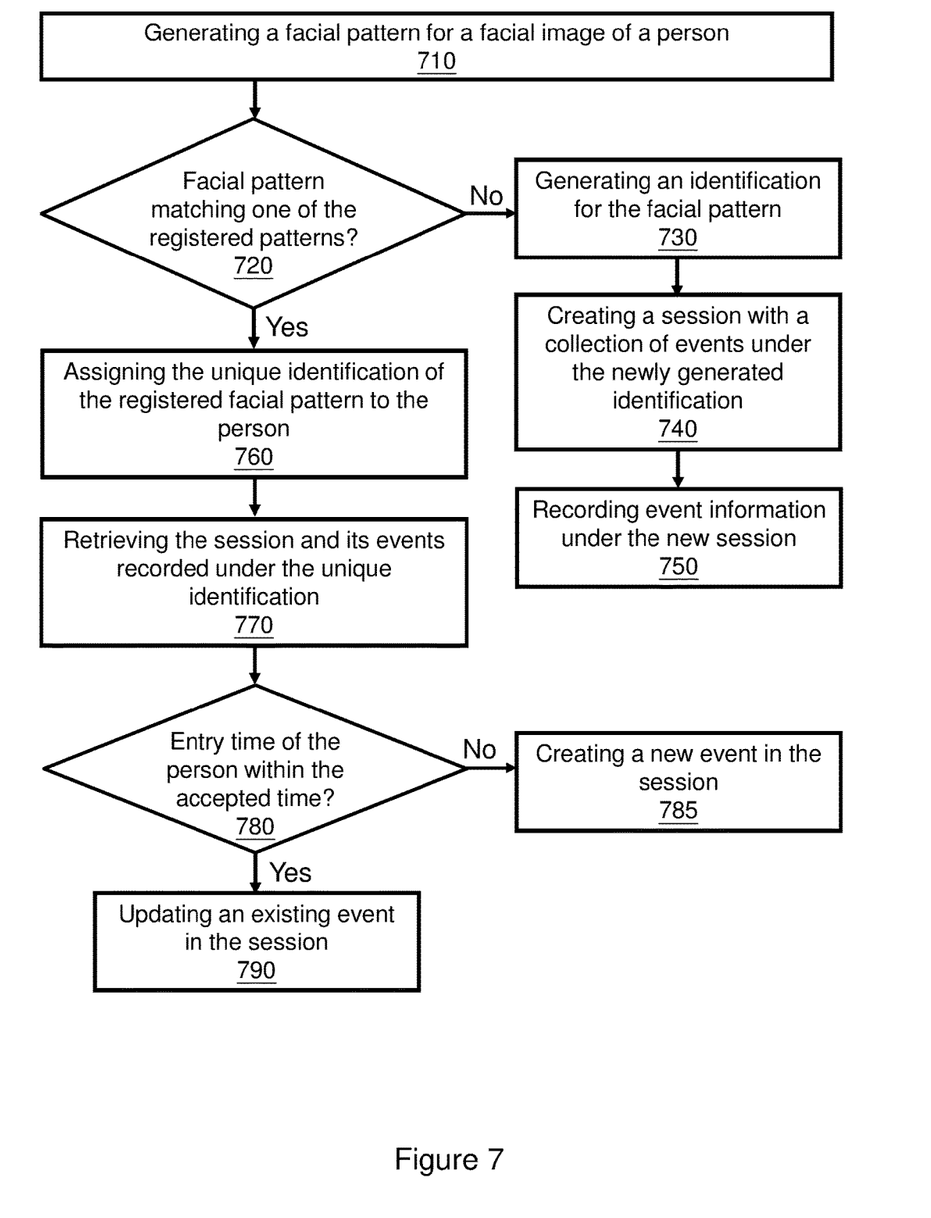
FIG. 7 is a method to expedite processing of facial recognition in a peer-to-peer (P2P) network in accordance with an example embodiment.

FIG. 7 is a method to expedite processing of facial recognition in a peer-to-peer (P2P) network in accordance with an example embodiment.

Block 710 states generating a facial pattern for a facial image of a person.

Consider an example in which a computer system includes two or more computers and displays in a LAN. Each computer includes a camera that can take a video of a person when the person steps into a field of view of the camera. The computer converts the captured facial image to a facial pattern and saves the facial pattern to a memory of the computer that stores a plurality of registered facial patterns and identifications, each identification corresponding to one of the facial patterns.

Block 720 determines whether the facial pattern matches one of the registered patterns.

The processor of the computer compares the facial pattern of the person with the plurality of registered facial patterns stored in the memory and determines whether the facial pattern of the person matches one the plurality of facial patterns stored in the memory. Example embodiments analyze parameters such as location of the face, gender, age, and time periods between events to determine the odds of the second event being a continuation of the first event.

If the answer to this determination is "no" then flow proceeds to block 730.

Block 730 states generating an identification for the facial pattern.

For example, a processor of the computer generates an identification for the facial pattern that does not match with any of the registered facial patterns saved in the memory of the computer.

Block 740 states Creating a session with a collection of events under the newly generated identification.

Example embodiments use a session to count the same person moving in and out of a field of view of one or more cameras in different events. Whether a detected face is a new person or a continuation of a previous event is determined based on a facial pattern of the person. For example, breaks in a same event occur when the person looks away from the camera for a short period of time or is blocked temporally by other moving objects.

As one example, the processor of the computer records an entry time of a new facial pattern and creates a session under the newly generated identification of the new facial pattern. When the person walks away from a field of view of the camera, the exit time of the facial pattern is also recorded, marking an end of an event of the person in the session. If the same person comes back to the camera after a while, a new event under the same session is created with a new entry time.

Block 750 states recording event information under the new session.

By way of example, the event information includes, but is not limited to, a gaze time of the person, facial expressions of the person, a location of the person and demographic information of the person, such as age and gender.

If the answer to the determination of block 720 is "yes" then flow proceeds to block 760.

Block 760 states assigning the unique identification of the registered facial pattern to the person.

For example, when a match is found in the registered facial patterns, then the existing identification of the registered facial pattern is retrieved from the memory. The retrieved identification of the registered facial pattern is then assigned to the person who has a facial pattern that matches one of the registered facial patterns.

Block 770 states retrieving the session and its events recorded under the unique identification.

For example, the person may pass by different computers in the system multiple times. Each pass is recorded as a different event under the same session. Each event has an entry time and an exit time.

Block 780 determines whether the entry time of the person is within an accepted time.

For example, the computer calculates a gap between the entry time of the person and an exit time of the registered facial pattern that matches the facial pattern of the person. If the gap is within an accepted time, then the flow proceeds to block 790, which states updating an existing event in the session. The previous event of the registered facial pattern and the new event of the person are combined as one event.

If the gap is out of an accepted time, then the flow proceeds to block 785, which states creating a new event in the session. The previous event of the registered facial pattern and the new event of the person are saved in the session as different events of the person. By way of example, the accepted time can be just a few minutes for a single store location to 2 hours for a mall type application or even 4 days for a multi-day sports event like a golf tournament.

The registered facial patterns and the identification of each facial pattern and the demographic information are continuously updated in sessions and events, and shared among the computers through a LAN. A report that includes a number of people passing through a certain area at any given time interval, and a distribution of gender, age, and gaze time can be generated. The report can further include an attention percent of the person based on a gaze time at an item, an entry time of people, and an exit time of the people.

By updating the registered facial patterns and their attributes continuously, the behavior of the same person is continuously tracked and recorded even though he or she is detected multiple times by one or more computers in the LAN.

Figure 8:
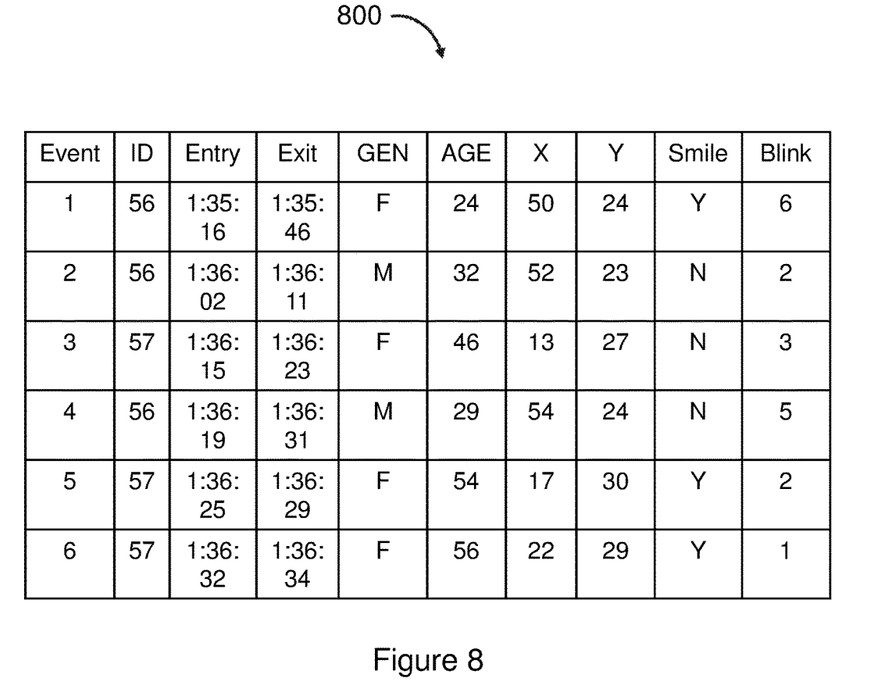
FIG. 8 is a table that records event information in accordance with an example embodiment

FIG. 8 is a table 800 that records event information in accordance with an example embodiment.

As shown in FIG. 8, event information such as entry time, exit time, gender (GEN), age, location (X and Y), facial expressions of smiling and blinking times are recorded in the table for each identification (ID). The identification (ID) is represented by a number. For example, table 800 records six events for two IDs that are 56 and 57. The same ID contributes to multiple events under different entry and exit time. The gender and age are analyzed based on the facial pattern generated for each event. The same person that shows up at different times under different event may be analyzed to be of different age or gender. For example, three events are recorded for ID 56 in row 1, 2 and 4, with two being male and one being female. The gender of ID 56 is then corrected from female to male for all events, and the age of ID 56 is updated as 28, averaging over 24, 32 and 29.

Smiles, blinks, and gaze time can be captured and stored as one or more of an amount of time, a frequency of occurrence (e.g., a number of times a person blinks or a number of times a person smiles), a yes or no indication, etc.

Figure 9:
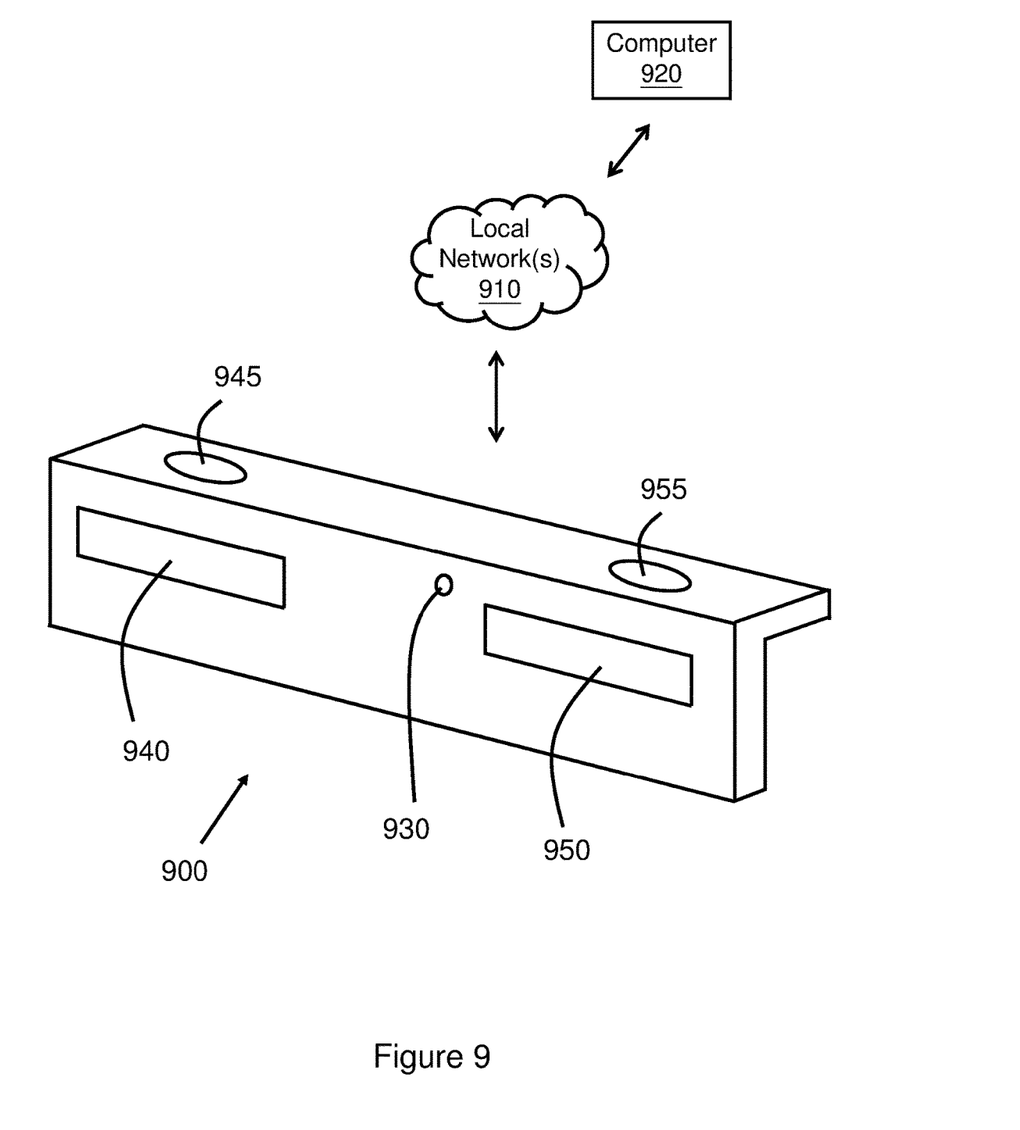
FIG. 9 is a digital shelf in accordance with an example embodiment.

FIG. 9 is a digital shelf 900 in accordance with an example embodiment.

The digital shelf 900 includes a camera 930, displays 940 and 950, and product holders 945 and 955. A computer 920 is either located inside the digital shelf or outside the digital shelf. The computer 920 communicates with the camera and the displays on the digital shelf wirelessly through one or more local networks, such as a LAN or a P2P network. Alternatively, the computer forms part of the digital shelf and communicates with the camera via a wired connection, bus connection, etc.

The camera 930 takes a video or a facial image of a person when the person steps in front of the digital shelf. The captured video or images are transmitted to the computer through the network for processing.

By way of example, the camera records a gaze time of a person who is continuously viewing at an item placed on the digital shelf and sends the recorded gaze time to the computer.

The computer receives videos or facial images from the camera and generates a facial pattern that is unique to the facial image of the person. The computer further compares the generated facial pattern with a plurality of registered facial patterns stored in a memory of the computer or of computers in the LAN. Each of the registered facial patterns has a unique facial identification. If none of the registered facial patterns match the facial pattern of the person, the computer will assign a unique facial identification to the person. The newly generated facial identification and its corresponding facial pattern are then saved to the memory to update the pool of registered facial patterns and identifications and broadcast to other computers in the LAN. If a match is found in the registered facial patterns, then no new identification is generated. The existing identification of the registered facial pattern that matches the facial pattern of the person is retrieved from the computer and assigned to the person.

In one example embodiment, other demographic information of the person such as age and gender are obtained by analyzing the facial pattern of the person, and saved in the memory under the unique identification of the person. Based on the demographic information of the person and on which item on the digital shelf the person is viewing, the computer retrieves media content from the memory and displays them on the displays 940 and 950 as a recommendation to the person.

In one example embodiment, the effectiveness of the recommendations is measured by tracking the gaze time at the display and facial expressions. The characteristics or behavior of the person who view the content at the display is then used to modify or adjust what will be selected to be presented as media content. The view behavior is monitored in order to evaluate the quality of the recommendations displayed to the person and make further adjustments in order to meet certain objectives.

The registered facial patterns and the identification of each facial pattern and the demographic information are continuously updated when a new person stops by the digital shelf or the same person comes back. The computer displays customized medial content on the displays of the digital shelf for each person.

In one example embodiment, the product holder 945 or 955 includes a sensor in communication with the display. The sensor senses if the product is picked up from the product holder and signals the display to display media content that is related to the product. For example, the sensor senses when an object is removed from or placed onto the display, counter, or other surface.

As used herein, a "local area network" is a computer network that interconnects computers within a limited area such as a residence, school, laboratory, university campus or office building and has its network equipment and interconnects locally managed The methods and apparatus in accordance with example embodiments are provided as examples, and examples from one method or apparatus should not be construed to limit examples from another method or apparatus. Further, methods and apparatus discussed within different figures can be added to or exchanged with methods and apparatus in other figures. Further yet, specific numerical data values (such as specific quantities, numbers, types, degrees, etc.) or other specific information should be interpreted as illustrative for discussing example embodiments.

What is claimed is:

1. A method executed by a computer system having two or more digital shelves in a peer-to-peer (P2P) network that expedites processing of facial recognition from facial images captured by cameras in the computer system and that provides a recommendation to a person in a retail environment, the method comprising:
    each of the two or more digital shelves, installed in the retail environment, comprising a processor, a memory, a network interface and a camera;
    each of the plurality of digital shelves:
        capturing, with the camera of the digital shelf in the P2P network, a facial image of the person;
        generating, from the facial image and by the digital shelf, a facial pattern that is unique to the facial image of the person;
        analyzing, by the digital shelf, the facial pattern to obtain a plurality of attributes of the facial pattern of the person, the attributes including an age of the person, a gender of the person, a facial expression of the person, a gaze time of the person toward the camera, and a location of the person;
        comparing, by the digital shelf, the facial pattern and the attributes of the person with a plurality of registered facial patterns and attributes stored in a memory of the digital shelf and from other digital shelves in the P2P network, each of the registered facial patterns having an unique identification;
        determining, by the digital shelf, whether the facial pattern of the person matches one of the plurality of registered facial patterns stored in the memory of the digital shelf and from other digital shelves in the P2P network based on calculating, by the digital shelf, a matching score of the facial pattern by comparing the attributes of the facial pattern with the attributes of the registered facial patterns stored in the memory of the digital shelf, and by comparing a mesh diagram of the facial pattern with mesh diagrams of the registered facial patterns stored in the memory of the digital shelf;

generating, from the facial pattern of the person and by the digital shelf, a facial identification that is unique to the person when none of the registered facial patterns stored in the memory of the digital shelf and from other digital shelves in the P2P network match the facial pattern of the person;

registering, in the memory of the digital shelf, the generated facial identification of the person, the facial pattern of the person, and the attributes of the facial pattern of the person;

transmitting, by the digital shelf and to other digital shelves that are peers in the P2P network, the facial identification that is unique to the person, the facial pattern of the person and the attributes of the facial pattern of the person;

retrieving, from the digital shelf in the P2P network, recommendation items based on the facial identification and the attributes of the person; and displaying, at a display in the P2P network, the recommendation items to the person when the person is located in a field of view of the camera.

2. The method of claim 1 further comprising:

obtaining, from the facial pattern and by the computer, an entry time of the person who steps into the field of view of the camera of the computer, an exit time of the person who is out of the field of view of the camera of the computer, and a location of the person;

calculating, by the computer, an attention percent of the person based on the gaze time, the entry time and the exit time of the person; and generating, by the computer, a footpath of the person based on the location, the entry time and the exit time of the person.

3. The method of claim 1 further comprising:

determining, by a sensor positioned at the display in the P2P network, a distance between the person and the display; and changing a font size of the recommendation items displayed at the display in accordance with the distance between the person and the display.

4. The method of claim 1 further comprising:

retrieving, by the computer and from the memory of the computer, a facial pattern from the registered facial patterns stored in the memory that matches the facial pattern of the person; and assigning, by the computer and to the person, the unique identification of the facial pattern stored in the memory that matches the facial pattern of the person.

5. The method of claim 1 further comprising:

adding, to the memory of the computer, the gaze time of the person to the attributes of the registered facial pattern when the computer determines the facial pattern of the person matches one of the registered facial pattern; and calculating, by the computer and based on the gaze time, an attention distribution of a number of people within the field of view of the camera.

6. The method of claim 1 further comprising:

generating, by the computer, a report that includes a number of people within a field of view of the camera at any given time interval, a footpath of the people in the P2P network, and a chart that shows a distribution of gender, age, gaze time at the display, and facial expressions of the people in the P2P network.

7. The method of claim 1, wherein the computer is a digital shelf that includes a sensor that senses when a product is removed from the digital shelf and a display, wherein the display changes display content in response to what the sensor senses.

8. A method that expedites processing of facial recognition from facial images captured by a plurality of digital shelves in a peer-to-peer (P2P) network and provides a recommendation to a person in an retail environment, the method comprising:

each of the plurality of digital shelves, installed in the retail environment, comprising a processing, a memory, a network interface and a camera;

each of the plurality of digital shelves:

capturing, with the camera of the digital shelf, a facial image of the person;

generating, from the facial image and by the digital shelf, a facial pattern that is unique to the facial image of the person;

analyzing, by the digital shelf, the facial pattern to obtain a plurality of attributes of the facial pattern of the person, the attributes including an age of the person, a gender of the person, a facial expression of the person, a gaze time of the person toward the camera, and a location of the person;

comparing, by the digital shelf, the facial pattern and the attributes of the person with a plurality of registered facial patterns and attributes stored in the memory of the digital shelf and from other digital shelves in the P2P network, each of the registered facial patterns having an unique identification;

determining, by the digital shelf, whether the facial pattern of the person matches one of the plurality of registered facial patterns stored in the memory of the digital shelf and from other digital shelves in the P2P network based on calculating, by the digital shelf, a matching score of the facial pattern by comparing the attributes of the facial pattern with the attributes of the registered facial patterns stored in the memory of the digital shelf, and by comparing a mesh diagram of the facial pattern with mesh diagrams of the registered facial patterns stored in the memory of the digital shelf;

generating, from the facial pattern of the person and by the digital shelf, a facial identification that is unique to the person when none of the registered facial patterns stored in the memory of the digital shelf and from other digital shelves in the P2P network match the facial pattern of the person;

registering, in the memory of the digital shelf, the generated facial identification of the person, the facial pattern of the person, and the attributes of the facial pattern of the person;

transmitting, by the digital shelf and to other digital shelves that are peers in the P2P network, the facial identification that is unique to the person, the facial pattern of the person and the attributes of the facial pattern of the person;

retrieving, from the digital shelves in the P2P network, recommendation items based on the facial identification and the attributes of the person; and displaying, at a display of one of the digital shelves in the P2P network, the recommendation items to the person when the person is located in a field of view of the camera.

9. The method of claim 8 further comprising:

obtaining, from the facial pattern and by the digital shelf, an entry time of the person who steps into the field of view of the camera of the digital shelf and an exit time of the person who is out of the field of view of the camera of the digital shelf;

transmitting, by the digital shelf and to other digital shelves in the P2P network that are peers to the digital shelf, the entry time and the exit time of the person; and generating, by one or more of the digital shelves, a footpath of the person based on the entry time, the exit time and the attributes of the person.

10. The method of claim 8 further comprising:

retrieving, from the memory of the digital shelf, a facial pattern from the registered facial patterns stored in the memory that matches the facial pattern of the person;

assigning, by the digital shelf and to the person, the unique identification of the facial pattern stored in the memory that matches the facial pattern of the person; and adding, to the memory of the digital shelf, the attributes of the person to the attributes of the registered facial pattern under the unique identification when the computer determines the facial pattern of the person matches one of the registered facial patterns.

11. The method of claim 8 further comprising:

generating, by one of the digital shelves, a report that includes a number of people within a field of view of the digital shelves at any given time interval, a footpath of the people in the P2P network, and an attention distribution of the people in the P2P network.

12. A computer system that expedites processing of facial recognition from facial images captured by a plurality of digital shelves in the P2P network and provide a recommendation to a person in a retail environment, the computer system comprising:

each of the plurality of digital shelves, installed in the retail environment, each comprising a processor;

a network interface;

a camera; and a memory having stored thereon instructions that when executed cause each of the plurality of digital shelves to:

receive a facial image of the person captured by the camera;

generate a facial pattern that is unique to the facial image of the person;

analyze the facial pattern to obtain a plurality of attributes of the facial pattern of the person, the attributes including an age of the person, a gender of the person, a facial expression of the person, a gaze time of the person toward the camera, and a location of the person;

compare the facial pattern and the attributes of the person with a plurality of registered facial patterns and attributes stored in the memory of the digital shelf and from other digital shelves in the P2P network, each of the registered facial patterns having an unique identification;

determine whether the facial pattern of the person matches one of the plurality of registered facial patterns stored in the memory of the digital shelf and from other digital shelves in the P2P network based on calculating a matching score of the facial pattern by comparing the attributes of the facial pattern with the attributes of the registered facial patterns stored in the memory of the digital shelf, and by comparing a mesh diagram of the facial pattern with mesh diagrams of the registered facial patterns stored in the memory of the digital shelf;

generate a facial identification that is unique to the person from the facial pattern of the person when none of the registered facial patterns stored in the memory of the digital shelf and from other digital shelves in the P2P network match the facial pattern of the person;

register the generated facial identification of the person, the facial pattern of the person, and the attributes of the facial pattern of the person;

transmit the facial identification that is unique to the person, the facial pattern of the person and the attributes of the facial pattern of the person to other digital shelves that are peers in the P2P network;

retrieve recommendation items based on the facial identification and the attributes of the person from the digital shelves in the P2P network; and display the recommendation items to the person at a display in the P2P network when the person is located in a field of view of the camera.

* * * * *